(12) United States Patent
Herman et al.

(10) Patent No.: US 11,279,122 B2
(45) Date of Patent: Mar. 22, 2022

(54) SUPPORTING SOLUTION FOR "IN AIR" GEOMETRIES IN 3D ADDITIVE MANUFACTURING

(71) Applicant: Robert Bosch Tool Corporation, Broadview, IL (US)

(72) Inventors: Gregory A Herman, Elk Grove Village, IL (US); Balazs Nagy, Schaumburg, IL (US)

(73) Assignees: ROBERT BOSCH TOOL CORPORATION, Broadview, IL (US); ROBERT BOSCH GMBH, Stuttgart (DE)

( * ) Notice: Subject to any disclaimer, the term of this patent is extended or adjusted under 35 U.S.C. 154(b) by 823 days.

(21) Appl. No.: 15/371,018

(22) Filed: Dec. 6, 2016

(65) Prior Publication Data

US 2018/0154589 A1    Jun. 7, 2018

(51) Int. Cl.
*B29C 64/393* (2017.01)
*B33Y 10/00* (2015.01)
(Continued)

(52) U.S. Cl.
CPC ............ *B33Y 10/00* (2014.12); *B29C 64/106* (2017.08); *B29C 64/386* (2017.08); *B29C 64/40* (2017.08);
(Continued)

(58) Field of Classification Search
CPC ... B29C 64/118; B29C 64/188; B29C 64/194; B29C 64/40
See application file for complete search history.

(56) References Cited

U.S. PATENT DOCUMENTS 6,193,923 B1 *  2/2001  Leyden ................. B33Y 50/02
                                              264/401
8,070,931 B1 * 12/2011  Cohen ..................... C25D 5/02
                                              205/118
(Continued)

FOREIGN PATENT DOCUMENTS

CN       103635305 A      3/2014
CN       104441652 A      3/2015
(Continued)

OTHER PUBLICATIONS

Libretexts. "9.3: The Dissolution Process." Chemistry LibreTexts, Libretexts, Jun. 5, 2019, chem.libretexts.org/Bookshelves/Introductory_Chemistry/Book:_The_Basics_of_GOB_Chemistry_(Ball_et_al.)/09:_Solutions/9.3:_The_Dissolution_Process. (Year: 2019).*
(Continued)

*Primary Examiner* — Timothy Kennedy
(74) *Attorney, Agent, or Firm* — Norton Rose Fulbright US LLP; Gerard Messina; Aaron Gruneberger (57) ABSTRACT

A support bridge for supporting an in-air surface of a three-dimensional (3D) object during a print process includes a first end, a second end, and a horizontal span that spans between the first end and the second end. The first end, second end, and span are situated in an intermediate layer, and the first end and second end of the support bridge contact, respectively, first and second surfaces of an abutment layer of the 3D object. The support bridge is constructed during the print process and is configured to support the in-air surface of the 3D object.

11 Claims, 10 Drawing Sheets

(51) Int. Cl.
    *B33Y 30/00* (2015.01)
    *B33Y 50/02* (2015.01)
    *B33Y 80/00* (2015.01)
    *B29C 64/106* (2017.01)
    *B29C 64/40* (2017.01)
    *B29C 64/386* (2017.01)

(52) U.S. Cl.
    CPC .............. *B33Y 30/00* (2014.12); *B33Y 50/02* (2014.12); *B33Y 80/00* (2014.12)

(56) References Cited

U.S. PATENT DOCUMENTS

| | | | | |
|---|---|---|---|---|
| 9,440,397 | B1* | 9/2016 | Fly | B33Y 10/00 |
| 10,059,053 | B2* | 8/2018 | Jaker | C08L 81/06 |
| 10,464,131 | B2* | 11/2019 | Mark | B22F 3/008 |
| 2005/0072113 | A1* | 4/2005 | Collins | B29C 64/40 |
| | | | | 52/782.1 |
| 2008/0006966 | A1 | 1/2008 | Mannella | |
| 2008/0170112 | A1* | 7/2008 | Hull | B29C 64/124 |
| | | | | 347/127 |
| 2009/0101278 | A1* | 4/2009 | Laberge-Lebel | B29C 64/106 |
| | | | | 156/275.5 |
| 2011/0060445 | A1* | 3/2011 | Heenan | B29C 64/106 |
| | | | | 700/119 |
| 2014/0034214 | A1* | 2/2014 | Boyer | B33Y 10/00 |
| | | | | 156/73.2 |
| 2015/0197060 | A1* | 7/2015 | Carr | B29C 64/118 |
| | | | | 264/40.1 |
| 2015/0202825 | A1* | 7/2015 | Cordingley | B33Y 80/00 |
| | | | | 264/401 |
| 2015/0314534 | A1 | 11/2015 | Yakubov et al. | |
| 2016/0167089 | A1* | 6/2016 | Ng | B33Y 10/00 |
| 2018/0326659 | A1* | 11/2018 | Gleyal-Martinez | B33Y 30/00 |
| 2018/0370121 | A1* | 12/2018 | Demuth | B29C 64/118 |

FOREIGN PATENT DOCUMENTS

| | | | |
|---|---|---|---|
| CN | 106132654 A | 11/2016 | |
| EP | 1057615 A2 | 12/2000 | |
| JP | 07227898 A * | 8/1995 | ........... B29C 64/106 |
| JP | 2005254523 A | 9/2005 | |
| WO | 2002/020251 A2 | 3/2002 | |

OTHER PUBLICATIONS

Neatherbot, ULTIMAKER Print# 9 THE 100mm Bridge, https://www.youtube.com/watch?v=EAwjlLTqFC0 , Mar. 5, 2014 (Year: 2014).*

Erik Cederberg, 3D Printing in the AIR done right! (Ultimaker 2+), https://www.youtube.com/watch?v=jfAxOG8FGa0 , Dec. 12, 2015 (Year: 2015).*

* cited by examiner

SUPPORTING SOLUTION FOR "IN AIR" GEOMETRIES IN 3D ADDITIVE MANUFACTURING

FIELD OF THE INVENTION

The present invention relates to providing support to otherwise unsupported surfaces during 3D additive manufacturing, and more specifically, to providing such support while optimizing the amount of print material required and in a manner by which such support is easily removable.

BACKGROUND 3D printing, or additive manufacturing, is process of making three dimensional solid objects based on blueprints provided by digital files. The synthesis of the desired 3D object is achieved by strategically generating successive layers of an additive material (i.e., print material) in a pattern on a platform of 3D printer until the entire object is created. The construction of the 3D object is driven by the digital files that provide the specifications that describe how to create the pattern of layers and the materials used to generate the object. The digital files specifying the design are provided by the user, and the digital files read by the 3D printer may include G-code files, computer-aided design ("CAD") files, STereoLithography ("STL") CAD files, or other file types generally used in additive manufacturing processes.

The generation of the successive layers of the additive material can be performed, for example, according to any one of: (1) Vat Photopolymerisation, (2) Material Jetting, (3) Binder Jetting, (4) Direction Energy Deposition, (5) Powder Bed Fusion, (6) Sheet Lamination, or (7) Material Extrusion. Specific processes of Material Extrusion used to generate the successive layers can involve making sequential deposits using fused deposition modeling ("FDM"), fused filament fabrication ("FFF"), or Direct Ink Writing ("DIW").

3D printers are generally protected from external influences by a build cage, and, within the build cage, the 3-D printer typically includes the following: (1) an extruder, (2) a guide rail system, (3) a build platform, (4) a filament spool, (5) and a motor for maneuvering the at least one extruder. The extruder may include a cooling system to regulate the temperature of the extruder.

Typically, during the operation of an FFF 3D printer, a plastic filament is unwound from a filament spool and supplied to at least one extruder. The extruder applies heat at a specific temperature, which melts the plastic filament to start material flow. Once the plastic filament has begun to flow, the motor for maneuvering the extruder uses the guide rail system to position (both horizontally and vertically) the extruder relative to the build platform to apply a first layer of the 3D object to the build platform. Due to the characteristics of the filament and the cooling system of the extruder, the filament cools shortly after it has been extruded. Once the first layer has been applied, the extruder is repositioned, and a second layer is applied on the surface of the first layer. This process is repeated until the 3D object is fully constructed.

Depending on the particular geometry of the desired 3D object and the print process implemented, support structures may be required to provide support for specific layers of the 3D object that do not have support from the previously printed underlying layer. The layers that do not have support from a previous layer are considered "in air," since surfaces produced in these layers are in the air and do not receive support from the 3D object itself. These "in air" surfaces may be overhanging portions, cavities, or "free-space" surfaces.

The first method includes using the print material (i.e., the material being used to construct the desired 3D object) to build the support structures. Once the print process is complete, the support structures are removed and discarded. However, removing the support structures typically requires manual filing, carving, and/or breaking of the support structures from the 3D object. This process can be highly labor intensive and lengthy. Furthermore, complex 3D objects often require significant amount of support; thus, in addition to requiring significant efforts to remove the support structures, large amount of print material is wasted in the construction of the support structures.

The second method includes using a first print material to construct the 3D object and a second, support material to construct the support structures. Once the print process is complete, the support structures may be removed from the 3D object because of lack of bonding between the print material and the support material or the support material may be dissolved with water or alcohol. However, this process can be cost ineffective, since it requires the 3D printer to have at least two extruders to print the two different materials. Additionally, a complex 3D object may still require a significant number of support structures, resulting in a large amount of the second support material being wasted constructing the support structures.

Both methods described above can also produce undesirable defects with respect to the bottom surface of any unsupported surfaces (i.e., "in air" surfaces). These defects occur since, despite a multitude of support structures constructed during the printing process, the unsupported surface still has unsupported lengths between support structures, and the flowing (i.e., melted) filament still must span these unsupported lengths. Compared to hardened (i.e., cooled) filament, the melted filament has significantly reduced strength. The reduction in strength results in the melted filament being unable to span any significant amount of unsupported length; accordingly, in the unsupported lengths, the melted filament may bow, warp, and break, which can led to poor surface finish and/or a failed print. These defects can be minimized by printing more support structures, but as discussed above, printing support structures can be a time and resource consuming process. Additionally, each contact point of a support structure and the bottom surface of the unsupported surface creates defects in the unsupported surface, since removing the support structure from the unsupported surface can be difficult and often results in less than a smooth surface.

SUMMARY

Embodiments of the present invention provide methods and systems to construct support structures that reduce the amount of material required to support "in air" surfaces and increase the ease of removing the support structures once printing of the 3D object is complete.

An example embodiment of the present invention relates to a support bridge for supporting an unsupported surface of a three-dimensional (3D) object during a print process, the support bridge comprising: a first end that contacts a first abutment surface in a first layer; a second end that contacts a second abutment surface in the first layer, the first and second ends being situated in an intermediate layer above the first layer; and a horizontal span that connects the first end to the second end, the span configured to support an entirety of the unsupported surface of the 3D object. For example, in an example embodiment, the first abutment surface and the second abutment surface are of or correspond to a layer of the 3D object. In this manner, the support bridge may be constructed out of a thin material, which reduces the amount of material required and makes the support bridge easily removable. For example, the support bridge may be removed simply by using a knife to cut away the horizontal span portion of the support bridge.

According to an example embodiment of the present invention, the support bridge is constructed by a 3D printer, and the support bridge and the 3D object are composed of different print materials, each extruded by a different respective extruder of the 3D printer.

According to an example embodiment of the present invention, the unsupported surface of the 3D object is printed directly onto the support bridge. In another example embodiment, the support bridge is composed of an elastomer material, and the first end of the support bridge extends horizontally in a direction away from the second abutment surface and past an outer edge of the first abutment surface, and the second end of the support bridge extends horizontally in a direction away from the first abutment surface and past an outer edge of the second abutment surface. In one example embodiment, once the print process is complete, a first force is applied to the first end of the support bridge and a second force is applied to the second end of the support bridge, where the first and second forces act in opposite directions and cause the support bridge to disconnect from the abutment surface and the unsupported surface.

According to an example embodiment, the first abutment surface is part of a layer of the 3D object, and the second abutment surface is part of a layer of a first support structure that is not part of the 3D object. In another example, the first abutment surface is part of a layer of a first support structure, and the second abutment surface is part of a layer of a second support structure.

According to an example embodiment, the 3D object is printed with a print material using a first extruder of a 3D printer, and the first support structure and the support bridge are printed with a second, support material using a second extruder of the 3D printer. In one example embodiment, the 3D object and the first support structure are printed with the print material, and the support bridge is printed with the second, support material. In one example embodiment, the first support structure does not contact the 3D object.

Example embodiments of the present invention relate to a method of creating the above described support bridge. An example of printing a support bridge for supporting an otherwise unsupported surface of a 3D object includes: identifying an abutment layer, an intermediate layer, an unsupported layer, and an unsupported surface; constructing the support bridge, which contacts the abutment layer and includes: a first end that contacts a first surface of the abutment layer, the first end being situated in the intermediate layer; a second end that contacts a second surface of the abutment layer, the second end being situated in the intermediate layer; and a horizontal span that connects the first end to the second end, the span configured to support an entirety of the otherwise unsupported surface of the 3D object; and printing the unsupported layer of the 3D object on top of the support bridge, the unsupported surface being situated in the unsupported layer.

In an example embodiment, when relatively large horizontal surfaces require support, to avoid sagging of the support bridge, one or more support columns are printed between the abutment surfaces of the portion of the 3D object already printed to provide intermediate support for the support bridge.

Example embodiments of the present invention relate to a method of printing a three-dimensional object, where an example of printing a 3D object includes: printing one or more layers of the 3D object, where a support structure is provided adjacent to the one or more layers of the 3D object, the support structure having a support surface; printing one or more intermediate layers of the 3D object onto the one or more layers of the 3D object, where the one or more intermediate layers are not printed onto the support surface of the support structure such that a stepped profile is formed; and printing a horizontal layer of the 3D object by depositing a filament in a transverse direction onto a top surface of the one or more intermediate layers and onto the support surface of the support structure.

According to an example embodiment, the stepped profile corresponds to a distance between the top surface of the one or more intermediate layers and the support surface of the support structure. According to an example embodiment, at least two intermediate layers of the 3D object are printed. Accordingly to an example embodiment, the support structure only contacts the 3D object at a bottom surface of the horizontal layer. Accordingly to an example embodiment, the support surface corresponds to a bottom surface of the horizontal layer.

These and other features, aspects, and advantages of the present invention are described in the following detailed description in connection with certain exemplary embodiments and in view of the accompanying drawings, throughout which like characters represent like parts. However, the detailed description and the appended drawings describe and illustrate only particular example embodiments of the invention and are therefore not to be considered limiting of its scope, for the invention may encompass other equally effective embodiments.

DETAILED DESCRIPTION

Figure 1:
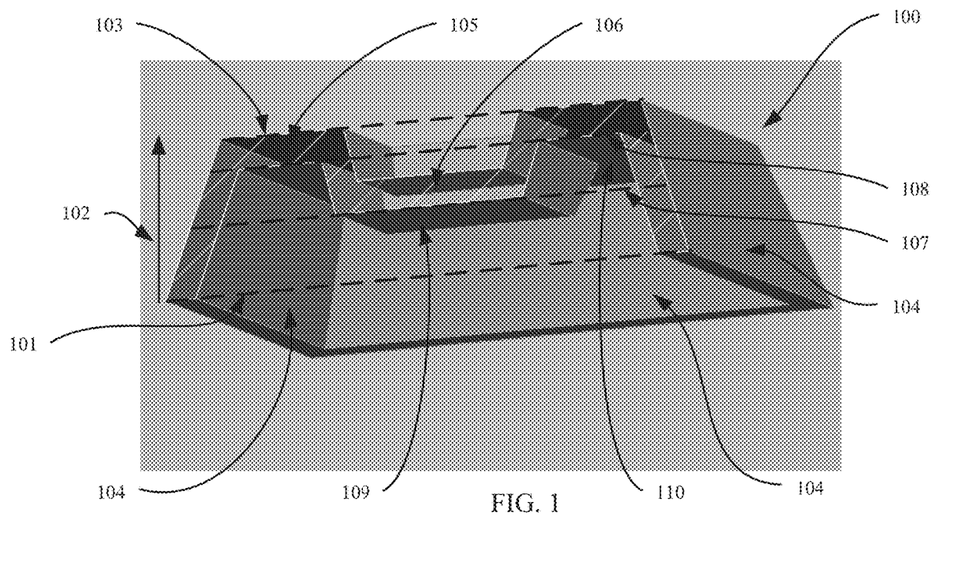
FIG. 1 is sectional perspective of an example 3D object.

FIG. 1 is a sectional perspective view of an example 3D object 100 printed using a 3D printing process, i.e., a 3D printer (not shown). 3D object 100 can be printed, for example, by starting at base layer 101 and adding successive layers to base layer 101 in direction 102, until final top layer 103 is reached. The illustrated example 3D object 100 shown in FIG. 1 includes side portion 104, top portion 105, and indentation portion 106.

As shown in FIG. 1, 3D object 100 can also include unsupported layers. For example, the illustrated 3D object 100 includes a first unsupported layer 107 and a second unsupported layer 108, which are printed above base layer 101 and below final layer 103 (although the final top layer 103 can also be an unsupported layer in an example. First and second unsupported layers 107 and 108 include first and second unsupported surfaces 109 and 110, respectively, which are not able to be supported by the layers printed immediately below unsupported layers 107 and 108, respectively. First and second unsupported surfaces 109 and 110 (i.e., "in air" surfaces) occur because of the specific geometry of 3D object 100 as well as the orientation of the 3D printing process. As can be understood from FIG. 1, depending on the geometry of 3D object 100 and the 3D printing process implemented, 3D object 100 can have more or less unsupported layers with corresponding unsupported surfaces.

Traditional methods of supporting unsupported surfaces, such as first and second unsupported surfaces 109 and 110, during 3D printing require printing solid support structures (not shown in FIG. 1) with surface contours corresponding oppositely to those of the 3D object to be printed. As discussed above, these support structures would either be printed out of the same material used to construct 3D object 100 or out of second different, support material.

Figure 2:
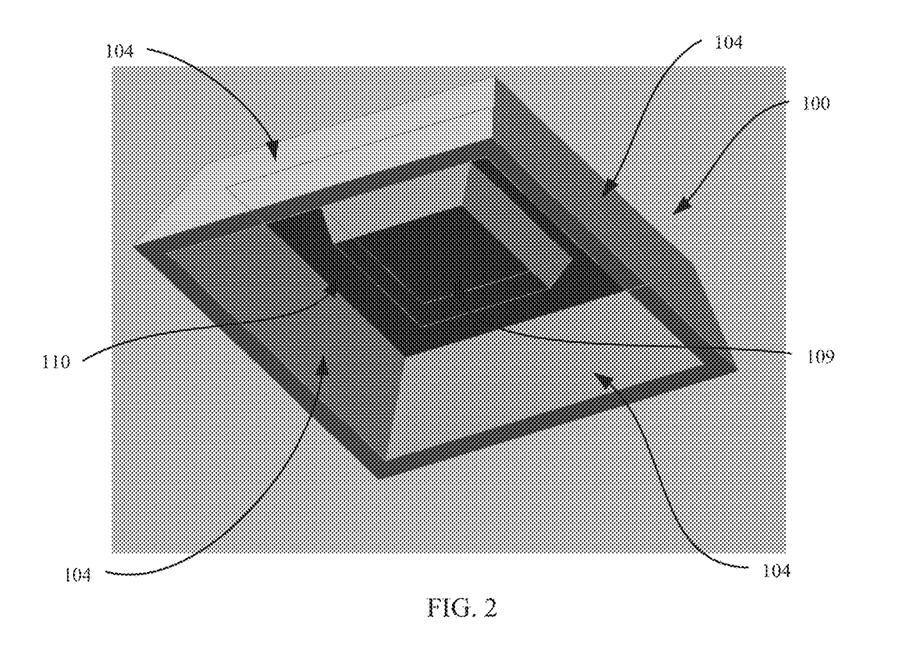
FIG. 2 is perspective view of the example 3D object highlighting unsupported surfaces.

FIG. 2 depicts a perspective view of 3D object 100, including first and second unsupported surfaces 109 and 110, and side portion 104.

Figure 3:
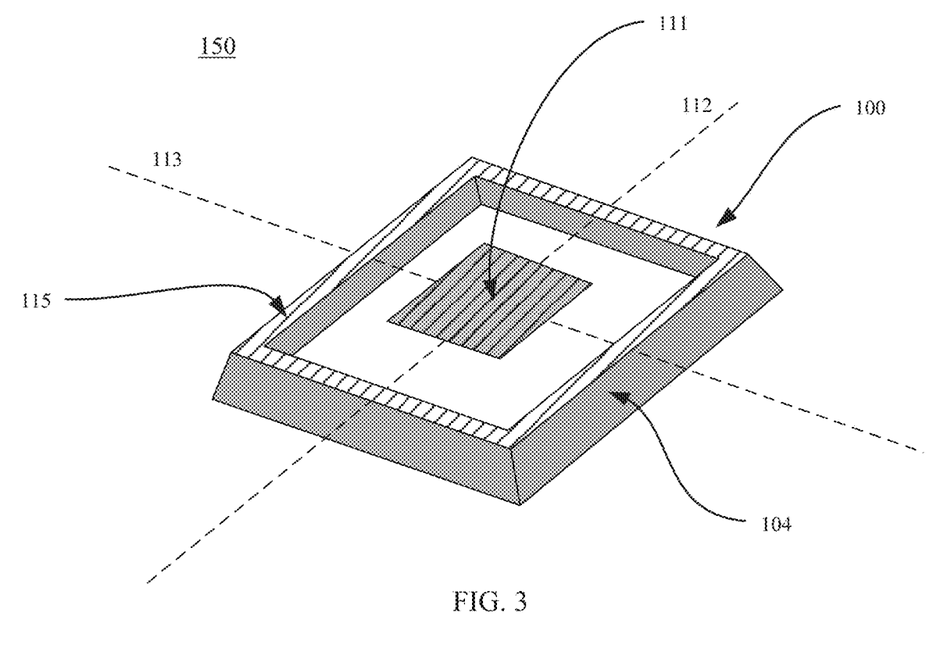
FIG. 3 is perspective view of an example 3D object with respect to one step of its printing, according to an example embodiment of the present invention.

FIG. 3 depicts a perspective view of partially printed 3D object 100 at first stage 150 of the 3D printing process in which a first abutment layer 115 of wall portion 104 has been printed in a first plane 111 defined by axes 112 and 113. In an example embodiment, 3D printer software, such as CAD software identifies first plane 111. Alternatively, a user identifies first plane 111. (Illustrated first plane 111 is not a printed object, but rather is a schematic for identifying the plane in the figure.)

Figure 4A:
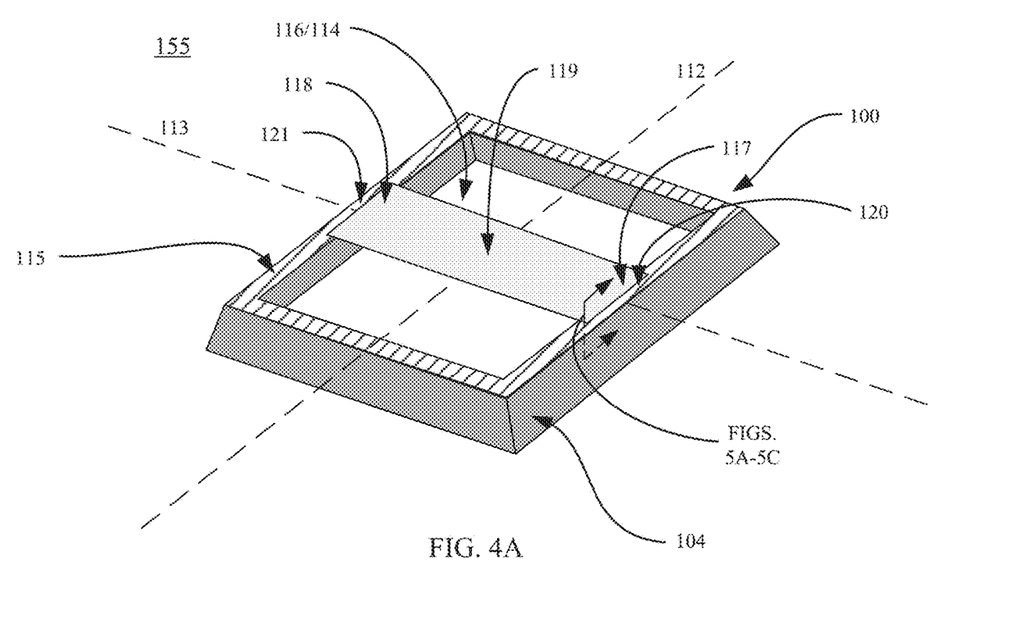
FIG. 4A is perspective view of the example 3D object with respect to another step of its printing, according to an example embodiment of the present invention.

FIG. 4A depicts a perspective view of partially printed 3D object 100 at second stage 155 of the 3D printing process. Second stage 155 occurs after first stage 150 and includes constructing first support bridge 116. First support bridge 116 is located in first intermediate layer 114, the first intermediate layer corresponding to the layer that is printed immediately above abutment layer 115. First support bridge 116 contacts first abutment layer 115 of wall portion 104 and includes first end 117, second end 118, and span 119. First end 117 is supported by first side 120 of first abutment layer 115 of side portion 104, and second end 118 is supported by second side 121 of first abutment layer 115 of side portion 104. First support bridge 116 is configured to support unsupported surface 109, and in an embodiment, the geometric configuration of first support bridge 116 is configured so that an entirety of surface 109 is supported by support bridge 116. In another example embodiment, the geometric configuration of support bridge 116 is configured so that only a portion of surface 109 is supported by first support bridge 116.

In an example embodiment, the location of first support bridge 116 relative to partially printed 3D object 100 is determined based on optimization of the geometric properties of partially printed 3D object 100, the 3D printing process, and/or the structural properties of first support bridge 116. Structural properties of first support bridge can be, for example, the amount of load that can be supported by the bridge, the material composition of the bridge, the distance between the first and second end, etc. For example, in FIG. 4B, first end 117 of first support bridge 116 is supported by third side 122 of first abutment layer 115 of side portion 104, and second end 118 is supported by fourth side 123 of first abutment layer 115 of side portion 104. Additionally, in an example embodiment, the geometric properties of support bridge 116 are determined based on the loads that will act on support bridge 116 and/or the structural properties of the material used to construct support bridge 116.

In an example embodiment of the present invention, first support bridge 116 is, for example, a film, tape, or any other suitably appropriate type of think and/or flat media. In one example embodiment, the 3D object and the first support structure are printed with the print material, and the support bridge is printed with a second, support material.

In an example embodiment, application of first support bridge 116 to first abutment surface 115 is performed manually by a user. In an alternative example embodiment, first support bridge 116 is printed by the same extruder that is printing the 3D object. In yet another example embodiment, first support bridge 116 is applied by a second extruder using different material than the material being used to print the 3D object. In an example embodiment, first support bridge 116 formed of an elastomer material.

In an example embodiment, support bridge 116 contains an adhesive that enables support bridge 116 to adhere to first abutment layer 115 of wall portion 104 of 3D object 100.

Figure 5A:
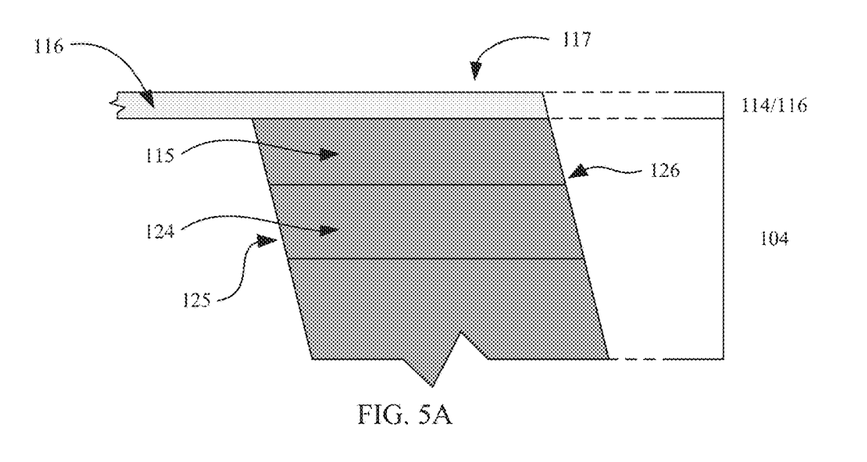
FIGS. 5A-5C are detail section views corresponding to FIG. 3, according to example embodiments of the present invention.
Figure 5B:
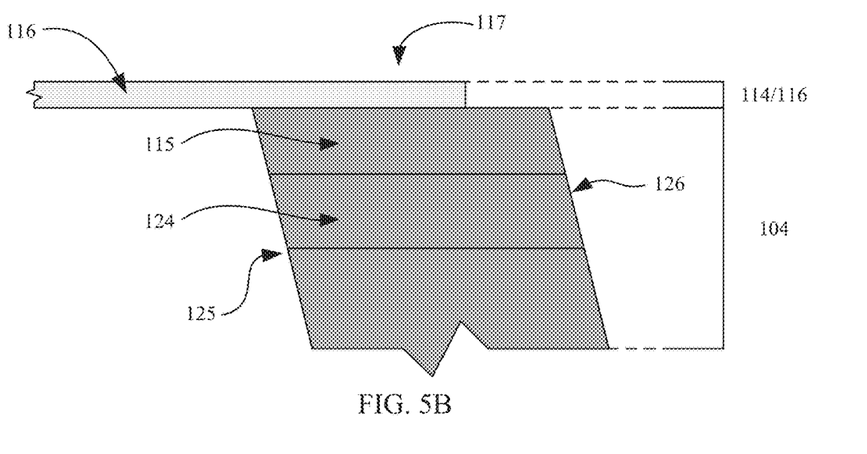
Figure 5C:
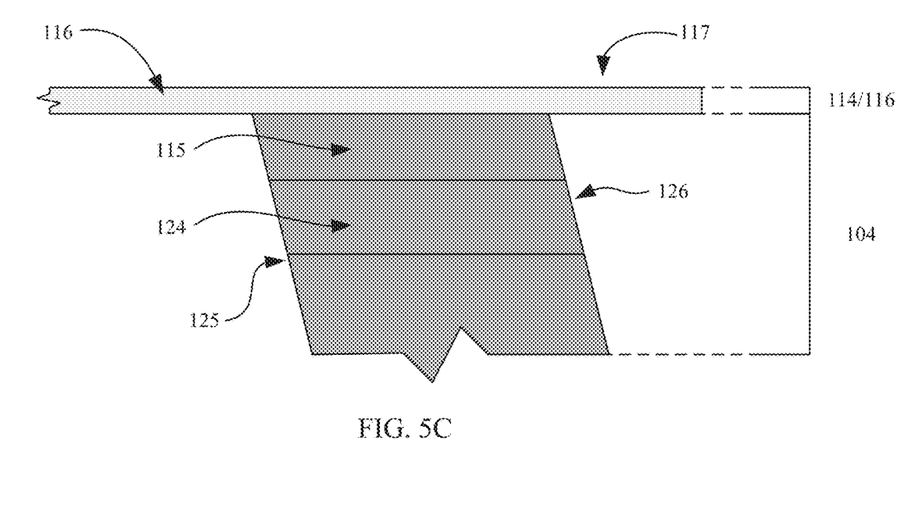

FIGS. 5A, 5B, and 5C (in which unshaded regions correspond to sections void of 3D object printing material and void of support bridge material) depict detail cross-sectional views of example embodiments of the positioning of first end 117 of first support bridge 116 relative to first abutment layer 115. In FIG. 5A, wall portion 104 includes previously printed layer 124 and first abutment layer 115. Wall portion 104 has inner side 125 and outer side 126. First support bridge 116 is configured in such way that first end 117 of first support bridge 116 is essentially flush with outer side 126 of wall portion 104, above first abutment layer 115. In contrast, in FIG. 5B, first end 117 of first support bridge 116 is located between inner side 125 and outer side 126 of wall portion 104, above first abutment layer 115. FIG. 5C depicts yet another alternative example embodiment in which first end 117 of first support bridge 116 extends horizontally, past outer side 126 of wall portion 104, above first abutment layer 115.

In the embodiment depicted in FIG. 5C, according to an example embodiment, first support bridge 116 is formed of an elastomer material. In this way, after 3D object 100 has been completely printed, a user can pull first end 117 and second end 118 (not shown), which extend, at opposite sides, past outer side 126 of wall portion 104, in opposite directions, which causes first support bridge 116 to deform, thereby breaking the bond between first support bridge 116 and first abutment layer 115, allowing easy removal of first bridge 116.

Figure 6:
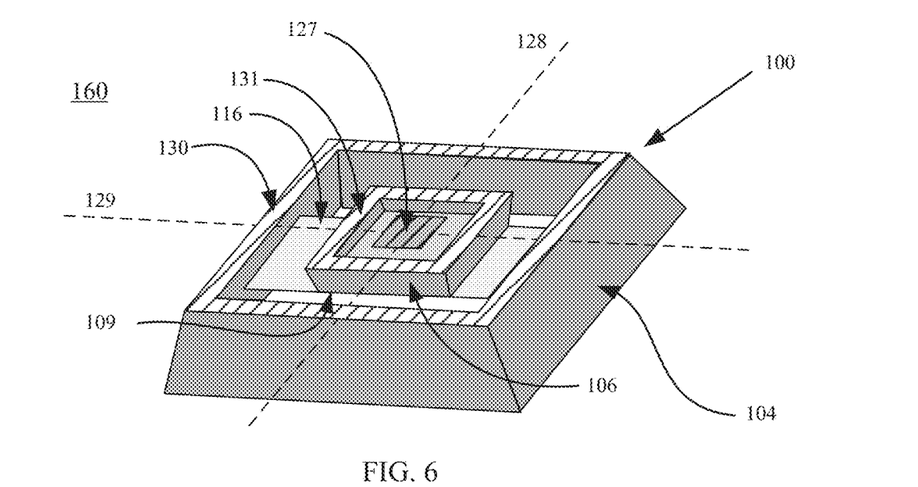
FIG. 6 is perspective view of the example 3D object with respect to another step of its printing, according to an example embodiment of the present invention.

FIG. 6 is a perspective view of partially printed 3D object 100 at third stage 160 of the 3D printing process in which a second abutment layer 130 of wall portion 104 and a third abutment layer 131 of indentation portion 106 have been printed in a second plane 127 defined by axes 128 and 129. In an example embodiment, 3D printer software, such as CAD software, identifies second plane 127. Alternatively, a user identifies second plane 127. (Illustrated second plane 127 is not a printed object, but rather is a schematic for identifying the plane in the figure.)

Additionally, FIG. 6 depicts the construction of unsupported surface 109, which was printed on first supporting bridge 116 after second stage 155. Unsupported surface 109 corresponds to a bottom surface of indentation portion 106.

Figure 7:
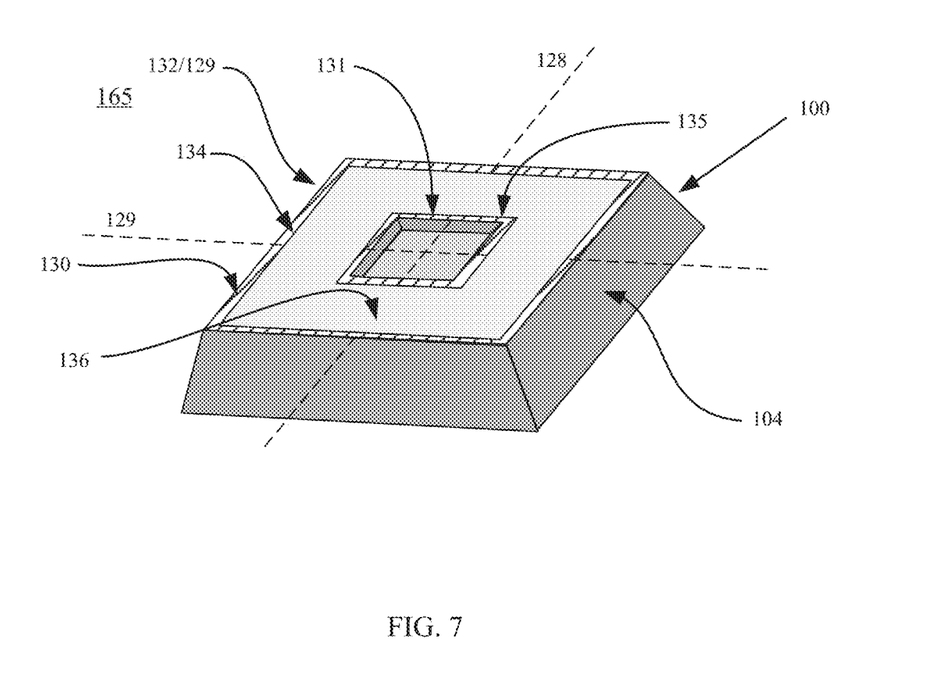
FIG. 7 is perspective view of the example 3D object with respect to another step of its printing, according to an example embodiment of the present invention.

FIG. 7 is a perspective view of partially printed 3D object 100 at fourth stage 165 of the 3D printing process. Fourth stage 165 occurs after third stage 160 and includes constructing second support bridge 132. Second support bridge 132 is located in second intermediate layer 129 and is defined by outer perimeter 134, inner perimeter 135, and span 136. Inner perimeter 135 of second support bridge 132 contacts third abutment layer 131 of indentation portion 106 and outer perimeter 135 of second support bridge contacts second abutment layer 130 of wall portion 104.

Figure 8A:
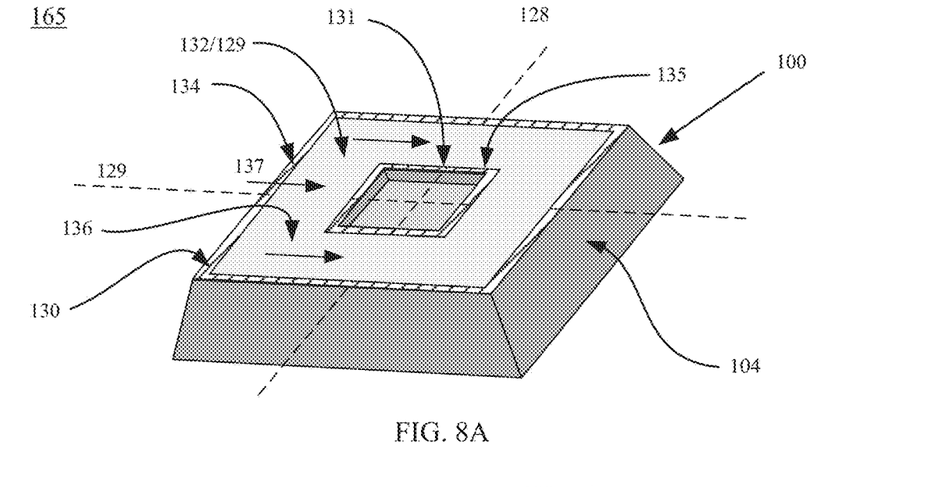
FIG. 8A is perspective view of the example 3D object with respect to another step of its printing, according to an example embodiment of the present invention.
Figure 8B:
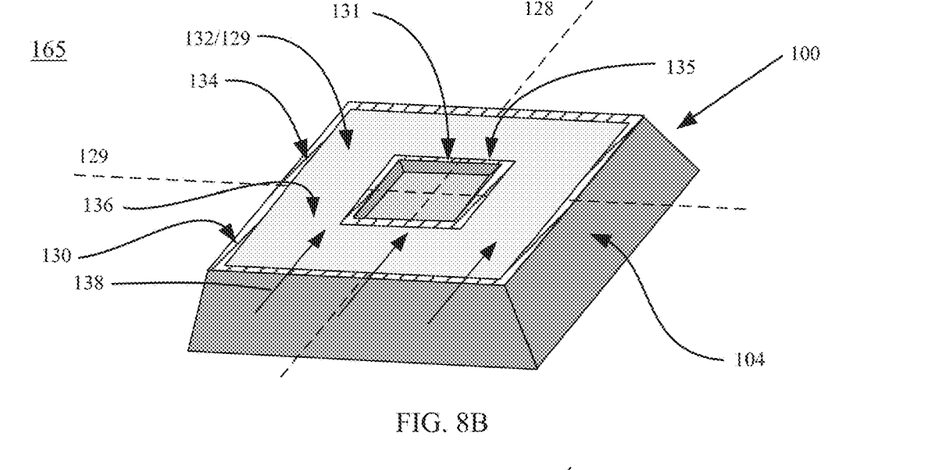
FIG. 8B is perspective view of the example 3D object with respect to another step of its printing, according to an example embodiment of the present invention.

FIGS. 8A and 8B, illustrate, that second support bridge 132 can be, for example, constructed by applying support bridge 132 either in direction 137 or in direction 138. In an example embodiment, support bridge 132 is constructed of first sections applied in direction 137 and second sections applied in direction 138. In an example embodiment, support bridge 132 can be applied as a sheet spanning between all walls of side portions 104, with the center subsequently being cut out.

Figure 9:
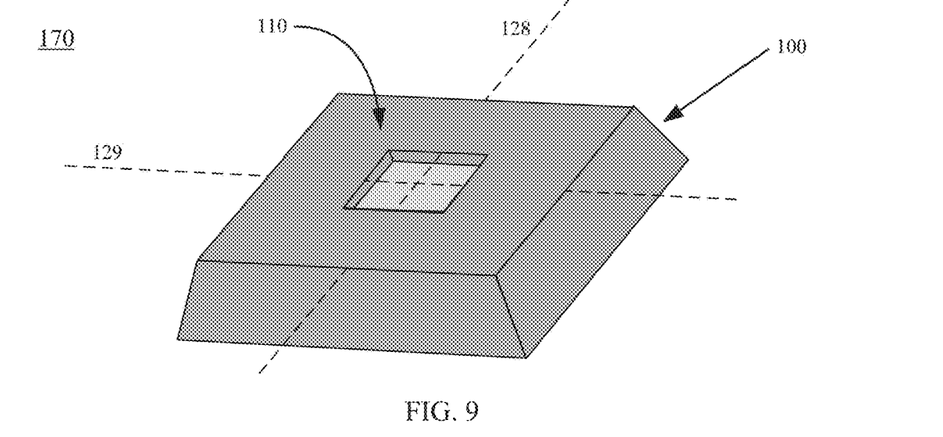
FIG. 9 is a perspective view of the example 3D object with respect to another step of its printing, according to an example embodiment of the present invention.

FIG. 9 is a perspective view of 3D object 100 at fifth stage 170 of the 3D printing process. Fifth stage occurs after fourth stage 165 and includes printing second unsupported surface 110 onto support bridge 132.

Figure 4B:
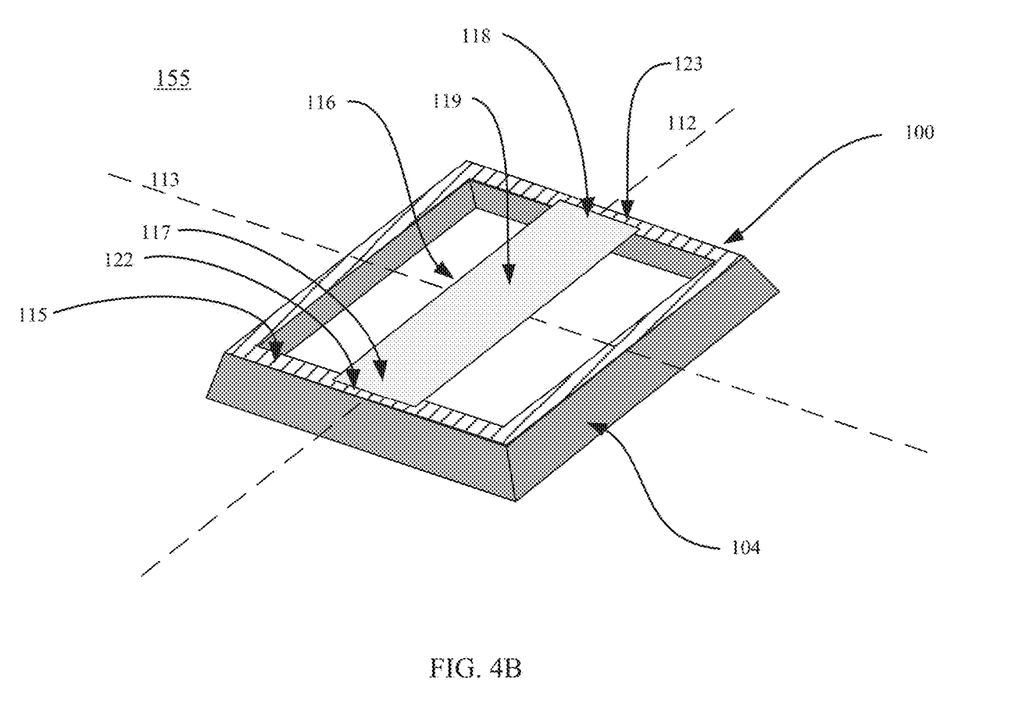
FIG. 4B is perspective view of the example 3D object with respect to another step of its printing, according to an example embodiment of the present invention.
Figure 10:
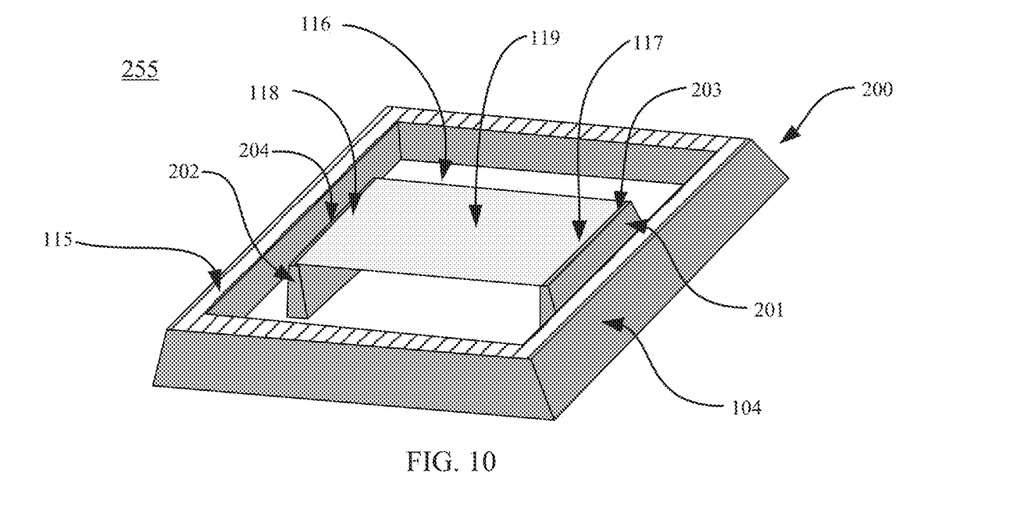
FIGS. 10 and 11 are perspective views corresponding to printing the 3D object using a support bridge that spans temporary support columns, according to example embodiments of the present invention.

FIG. 10 is a perspective view of partially printed 3D object 200 at second stage 255 according to a second embodiment (corresponding to stage 155 of a previously described embodiment). 3D object 200 is printed in the same manner as 3D object 100; however, instead of first end 117 and second end 118 of first support bridge 116 contacting first abutment layer 115 in wall portion 104, first end 117 contacts abutment layer 115 at a surface 203 of first support structure 201, and second end 118 contacts abutment layer 115 at a surface 204 of second support structure 202. In this manner, first support bridge 116 can be printed without contacting wall portion 104 of 3D object 200 (which is advantageous because it avoids leaving a void within wall portion 104 when support bridge 116 is later removed, or, according to an embodiment in which support bridge 116 is not removed from on top of a printed surface, but is rather cut away around printed surface, it avoids leaving material of support bridge 116 in the wall portion 104 in an embodiment where those materials differ). In an example embodiment, bridge 116 is constructed as shown in FIGS. 4A-4B in instances where opposite sides of the wall portion 104 are close enough to each other that support bridge 116 can extend between the opposite sides without sagging, but is constructed as shown in FIG. 10 in instances where the distance between the opposite sides of the wall portion 104 are so far from each other that bridge 116 would sag if supported by only wall portion 104.

In an example embodiment, support structures 201 and 202 are printed out of the same material used to construct 3D object 200, e.g., using the same extruder. In an alternative example embodiment, support structures 201 and 202 are printed using a different material than the material used to construct 3D object 200 and can be extruded using a second, separate extruder.

Figure 11:
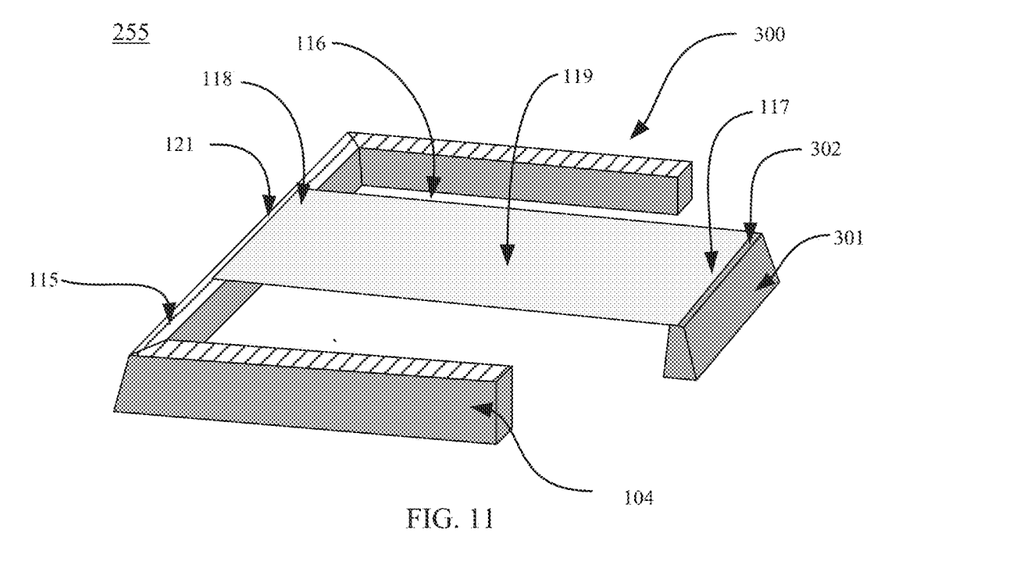

FIG. 11 is a perspective view of 3D object 300 at second stage 355 according to a third example embodiment (corresponding to stages 155 and 255 of previously described embodiments). 3D object 300 is printed in the same manner as 3D object 100; however, instead of first end 117 of first support bridge 116 contacting first abutment layer 115 in wall portion 104, first end 117 contacts abutment layer 115 at a surface 302 of first support structure 301. In an example embodiment, support structure 301 is printed out of the same material and/or using the same extruder used to construct 3D object 300. In an alternative embodiment, support structure 301 is printed using a different material than the material used to construct 3D object 300 and can be extruded using a second, separate extruder.

Figure 12:
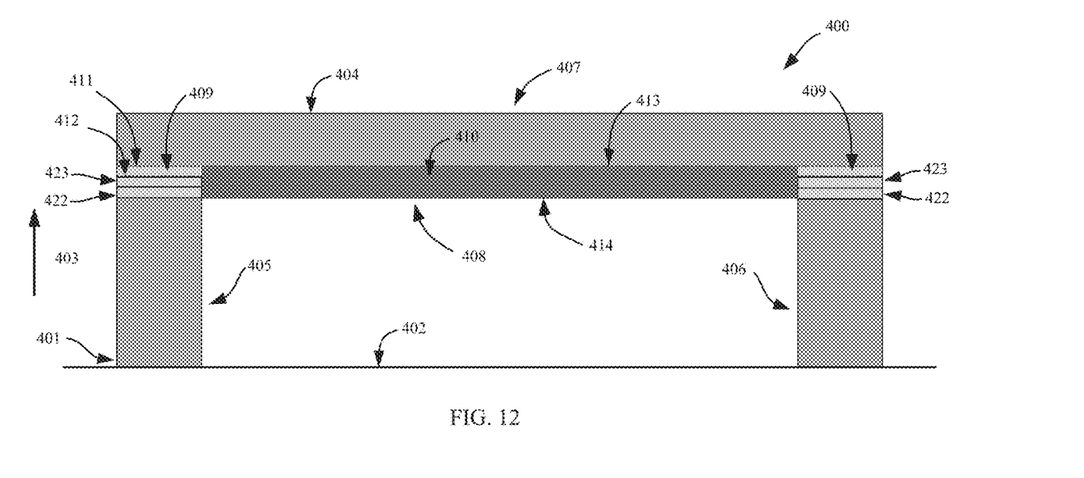
FIG. 12 is a side view of an example 3D object, printed according to an example embodiment of the present invention.

FIG. 12 is a side view of a further example 3D object 400 printed using a 3D printing process, i.e., with a 3D printer (not shown), using a method of another example embodiment of the present invention, in which a false floor is initially provided to support an otherwise unsupported layer, which false floor is removed subsequent to the printing of the unsupported layer. 3D object 400 can be printed, for example, by starting at base layer 401, which is printed on print surface 402, and adding successive layers to base layer 401 in direction 403, until final top layer 404 is reached. The illustrated example 3D object 400 shown in FIG. 12 includes first side portion 405, second side portion 406, and top portion 407. 3D object 400 also includes horizontal layer 408. Horizontal layer 408 has supported portion 409 and unsupported portion 410. Supported portion 409 has top surface 411 and bottom surface 412. Unsupported portion 410 has top surface 413 and unsupported surface 414. In an example embodiment, 3D printer software, such as CAD software, identifies horizontal layer 408, supported portion 409, bottom surface 412 of supported portion 409, top surface 411 of supported portion 409, unsupported portion 410, top surface 413 of unsupported portion 410, and unsupported surface 414 of unsupported portion 410.

Figure 13:
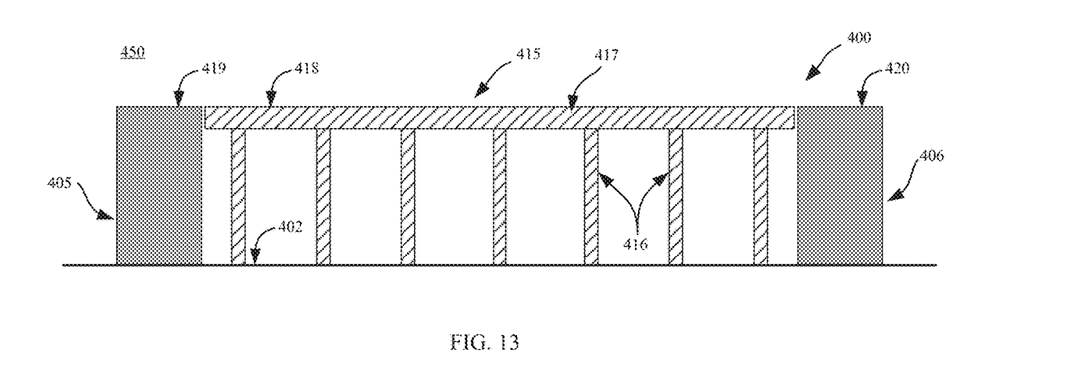
FIG. 13 is a side view of the 3D object at one step of its printing, according to an example embodiment of the present invention.

FIG. 13 depicts a side view of partially printed 3D object 400 at first stage 450 of the 3D printing process in which first side portion 405 and second side portion 406 are partially printed. At first stage 450, support structure 415, which includes support columns 416, support span 417, and support surface 418 of support span 417, is printed. The location of support surface 418 is selected to correspond to unsupported surface 414, as shown in FIG. 12. First side portion 405 has top surface 419, and second side portion 406 has top surface 420.

Figure 14:
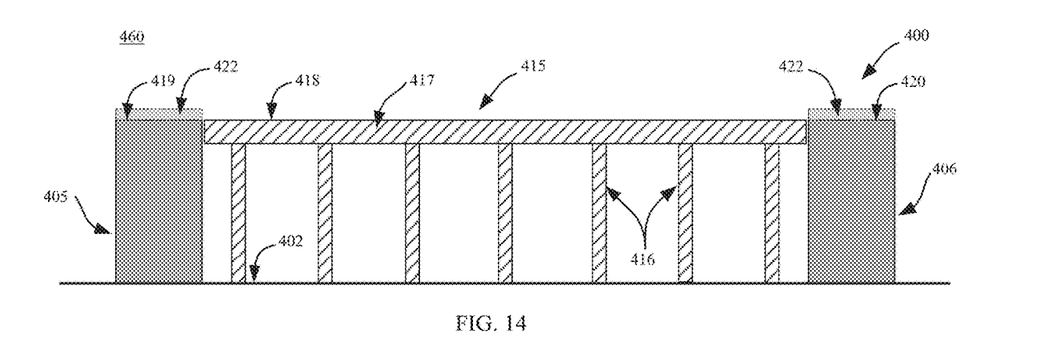
FIG. 14 is a side view of the 3D object at another step of its printing, according to an example embodiment of the present invention.

FIG. 14 depicts a side view of partially printed 3D object 400 at second stage 460 of the 3D printing process in which first intermediate layer 422 is printed onto top surface 419 of first side portion 405 and top surface 420 of second side portion 406. First intermediate layer 422 is not printed onto support surface 418 of support span 417.

Figure 15:
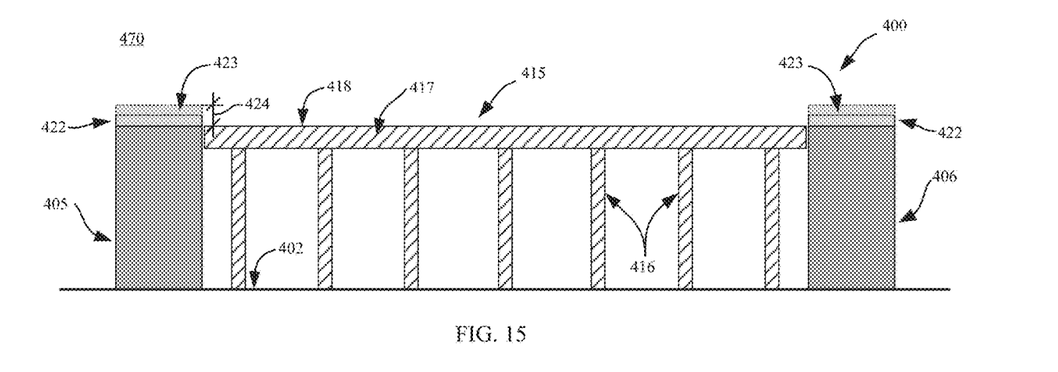
FIG. 15 is a side view of the 3D object at a further step of its printing, according to an example embodiment of the present invention.

FIG. 15 depicts a side view of partially printed 3D object 400 at third stage 470 of the 3D printing process in which second intermediate layer 423 is printed onto first intermediate layer 422. Similar to second stage 460, second intermediate layer 423 is not printed onto support surface 418 of support span 417. As a result of first intermediate layer 422 and second intermediate layer 423 not being printed onto support surface 418 of support span 417, gap 424 is created during the printing process.

Figure 16:
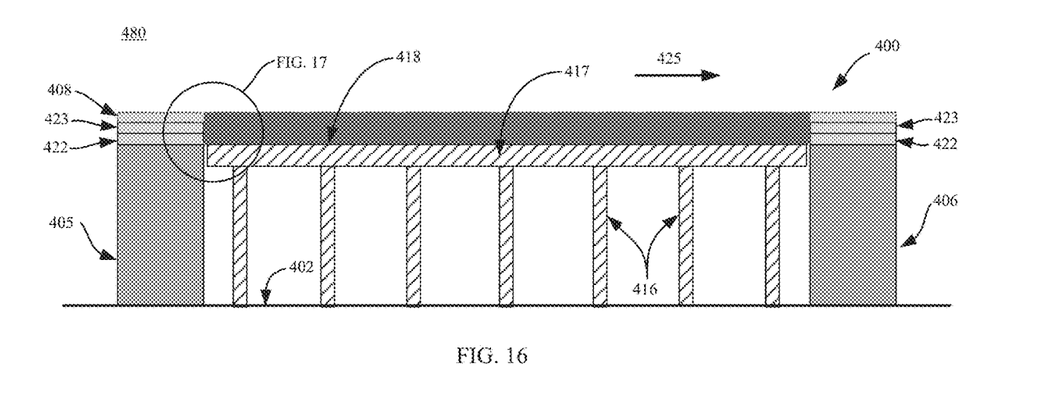
FIG. 16 is a side view of the 3D object at another step of its printing, according to an example embodiment of the present invention.
Figure 17:
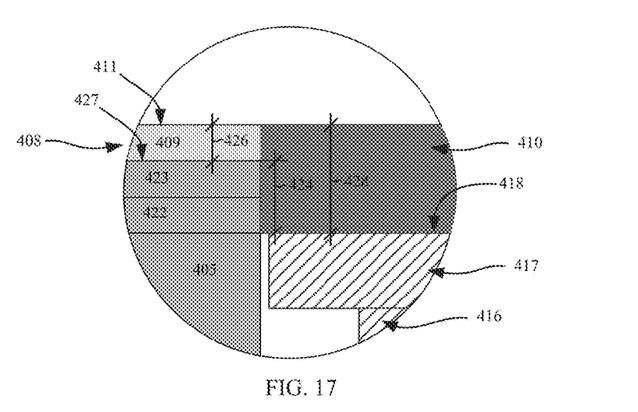
FIG. 17 is a detail side view corresponding to FIG. 16, according to example embodiments of the present invention.

FIG. 16 depicts a side view of partially printed 3D object 400 at fourth stage 480 of the 3D printing process in which horizontal layer 408 is printed onto second intermediate layer 423 and support surface 418 of support span 417. FIG. 17 is a detailed side view of horizontal layer 408. In an example embodiment, horizontal layer 408 may be printed by an extruder of the 3D printer (not shown) in direction 425.

As shown in FIG. 17, distance 426 corresponds to the thickness of supported portion 409 of horizontal layer 408 in an area above second intermediate layer 423 (i.e., the distance from top surface 411 of horizontal layer 408 to top surface 427 of second intermediate layer 423) and distance 428 corresponds to the thickness of unsupported portion 410 of horizontal layer 408 (i.e., the distanced from top surface 411 of horizontal layer 408 to support surface 418 of support span 417. Gap 424 is also illustrated in FIG. 17 (although gap 424 had already been filled in at stage 480).

In an example embodiment, as 3D printer extruder moves in direction 425 during stage 480, the distance between the extruder and the surface onto which the filament is being deposited changes from distance 426 to distance 428, the difference between distance 426 and distance 428 corresponding to gap 424. Because gap 424 exists, filament flowing from the 3D printer extruder onto support surface 418 must travel a greater distance than filament flowing from the 3D printer extruder onto top surface 427 of second intermediate layer 423. Additionally, the pressure exerted by 3D printer extruder onto the filament flowing onto support surface 418 is less than the pressure exerted onto the filament flowing onto second intermediate layer 423, since there is an increase in area between the extruder and the surface onto which the filament is being deposited, in which increased area the filament can flow. As a result of an increase in flowing distance (i.e., distance 428) and decrease in pressure, unsupported portion 410 of horizontal layer 408 forms, but does not strongly fuse, onto support surface 418. Furthermore, since unsupported portion 410 of horizontal layer 408 is printed after first intermediate layer 422 and second intermediate layer 423 are printed, support surface 418 would have already begun to harden (i.e., cool) during the time layers 422 and 423 were printed, which further contributes to unsupported portion 410 of horizontal layer 408 not fusing to unsupported surface 418.

Figure 18:
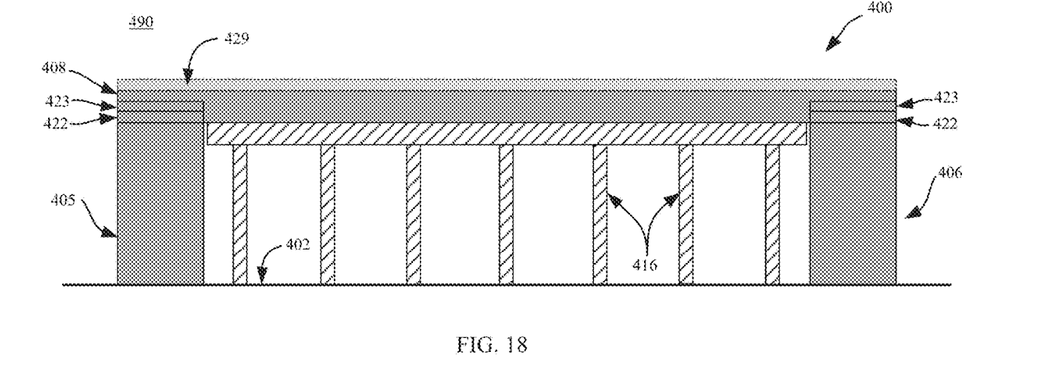
FIG. 18 is a side view of the 3D object at another step of its printing, according to an example embodiment of the present invention.

FIG. 18 depicts a side view of partially printed 3D object 400 at fifth stage 490 of the 3D printing process in which fourth layer 429 is printed onto horizontal layer 408. At stage 490, the print process may continue adding success layers of filament until 3D object 400 is complete. Support structure 415 provides support to otherwise unsupported portion 410 during its print, so that unsupported portion 410 does not sag. Because of the lack of fusion between the unsupported portion 410 and support surface 418, support structure 415 can be removed from under portion 410 without damaging surface 414 of portion 410. Additionally, because columns 416 do not directly contact surface 414, but rather support span 417 is printed on columns 416 with portion 410 being printed on support span 417, unevenness due to the spaces between columns 416 results in a bottom surface of support span 417, while surface 414 of portion 410 is substantially smooth because it is printed onto the relatively smooth support surface 418 of support span 417.

Although the above-described embodiment included printing of two intermediate layers 422 and 423 between a position corresponding to the support surface 418 and the printing of horizontal layer 408, in other examples, fewer or more intermediate layers can be printed, for example, as a function of a distance of the extruder nozzle from the print surface and as a function of a width or diameter of the mouth of the extruder nozzle from which the filament is expelled toward the print surface. In this regard, the larger the ratio of the width or diameter of the mouth of the nozzle to the distance from the print surface, the greater the pressure applied to the filament in a typical print layer, and the greater the number of skipped print layers the printer is able to fill in a single pass of filament extrusion.

An example embodiment of the present invention is directed to one or more processors, which can be implemented using any conventional processing circuit and device or combination thereof, e.g., a Central Processing Unit (CPU) of a Personal Computer (PC) or other workstation processor, to execute code provided, e.g., on a non-transitory computer-readable medium including any conventional memory device, to perform any of the methods described herein, alone or in combination. The one or more processors can be embodied in a server or user terminal or combination thereof. The user terminal can be embodied, for example, as a desktop, laptop, hand-held device, Personal Digital Assistant (PDA), television set-top Internet appliance, mobile telephone, smart phone, etc., or as a combination of one or more thereof. The memory device can include any conventional permanent and/or temporary memory circuits or combination thereof, a non-exhaustive list of which includes Random Access Memory (RAM), Read Only Memory (ROM), Compact Disks (CD), Digital Versatile Disk (DVD), and magnetic tape.

For example, according to an example embodiment, a processor executes software that analyzes a design of an object to be printed according to an input specification to identify in-air layers of the object in which, when the object is printed, would include a portion of the object that is above a bottom-most base layer of the object, but would not be supported by any of the lower layers; the processor then automatically halts a print of the 3D object when the identified layer is reached so that a user can spread a support bridge over the top-most layer that had already been printed. When the processor then receives user-input, e.g., entered by a user through an input device, such as a keyboard or soft or hard button, that the bridge has been laid, the processor outputs a control signal to actuate the printer to continue the build of the 3D object. The processor would be repeated for any of the layers identified as including an in-air surface. According to an embodiment in which an extruder is used to automatically build the bridge out of a material different than that used for building the 3D object, the processor outputs signals for halting printing of the 3D object, activating a second extruder for building the bridge, and subsequently restarting the first extruder to continue building of the 3D object. According to the example embodiment in which support structures for the support bridge are used, in an example embodiment, the processor outputs signals for constructing the support structures, and then for building the support bridge or for halting printing so that a user can manually spread the support bridge, as described above.

An example embodiment of the present invention is directed to one or more non-transitory computer-readable media, e.g., as described above, on which are stored instructions that are executable by a processor and that, when executed by the processor, perform the various methods described herein, each alone or in combination or sub-steps thereof in isolation or in other combinations.

An example embodiment of the present invention is directed to a method, e.g., of a hardware component or machine, of transmitting instructions executable by a processor to perform the various methods described herein, each alone or in combination or sub-steps thereof in isolation or in other combinations.

The above description is intended to be illustrative, and not restrictive. Those skilled in the art can appreciate from the foregoing description that the present invention can be implemented in a variety of forms, and that the various embodiments can be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings, specification, and following claims.

What is claimed is:

1. A method of printing, the method comprising:
   identifying, by processing circuitry, an abutment layer of a three-dimensional (3D) object, an intermediate layer, an unsupported layer, and an unsupported surface;
   the processing circuitry pausing a printing of the 3D object for construction of a support bridge or actuating the construction of the support bridge partially onto first and second upper surfaces of the abutment layer, wherein the support bridge includes:
      a first end situated in the intermediate layer and that contacts the first upper surface of the abutment layer between outer and inner edges of the first upper surface of the abutment layer;
      a second end situated in the intermediate layer and that contacts the second upper surface of the abutment layer; and
      a linear horizontal span that spans between the first and second ends;
   outputting, by the processing circuitry, a signal that actuates a printer to print an in-air surface of the 3D object onto the support bridge in the unsupported layer as the identified unsupported surface; and
   resuming the printing of the 3D object, wherein the resumption includes printing a layer of the 3D object partially onto the first end of the support bridge and partially directly onto the first upper surface of the abutment layer between the first end of the support bridge and the outer edge of the upper surface of the abutment layer.

2. The method claim 1, wherein the first and second upper surfaces of the abutment layer are surfaces of the 3D object prior to completion of the printing of the 3D object.

3. The method of claim 1, wherein the support bridge is constructed by a 3D printer actuated by the processing circuitry and is composed of a support material extruded by a first extruder, the support material being different than a print material, which is extruded by a second extruder of the 3D printer for printing the 3D object.

4. The method of claim 3, wherein the support bridge is composed of an elastomer material.

5. The method of claim 3, further comprising, subsequent to completion of the print process:
   applying a first force to the first end of the support bridge; and
   applying a second force to the second end of the support bridge, wherein the first and second forces act in opposite directions and cause the support bridge to disconnect from the first and second surfaces of the abutment layer and from the in-air surface.

6. A method of printing or printing a three-dimensional (3D) object that includes an unsupported surface, the method comprising:
   identifying, by processing circuitry, an abutment layer of a three-dimensional (3D) object, an intermediate layer, an unsupported layer, and an unsupported surface;
   the processing circuitry pausing a printing of the 3D object for construction of a support bridge or actuating the construction of the support bridge partially onto first and second upper surfaces of the abutment layer, wherein the support bridge includes:
      a first end situated in the intermediate layer and that contacts the first upper surface of the abutment layer;
      a second end situated in the intermediate layer and that contacts the second upper surface of the abutment layer; and
      a horizontal span that spans between the first and second ends; and
   outputting, by the processing circuitry, a signal that actuates a printer to print an in-air surface onto the support bridge in the unsupported layer as the identified unsupported surface;
   wherein the first end of the support bridge is positioned, with respect to a direction that extends horizontally away from the second end of the support bridge, past the outer edge of the first upper surface of the abutment layer, which is further from the second end of the support bridge than the inner edge of the first upper surface of the abutment layer, so that the first end of the support bridge is a free end that does not contact any lower surface, and the second end of the support bridge is positioned, with respect to a direction that extends horizontally away from the first end of the support bridge, past an outer edge of the second upper surface of the abutment layer, which is further from the first end of the support bridge than an inner edge of the second upper surface of the abutment layer, so that the second end of the support bridge is a free end that does not contact any lower surface.

7. The method claim 6, wherein the first and second upper surfaces of the abutment layer are surfaces of the 3D object prior to completion of the printing of the 3D object.

8. The method of claim 6, wherein the support bridge is constructed by a 3D printer actuated by the processing circuitry and is composed of a support material extruded by a first extruder, the support material being different than a print material, which is extruded by a second extruder of the 3D printer for printing the 3D object.

9. The method of claim 8, wherein the support bridge is composed of an elastomer material.

10. The method of claim 6, further comprising, subsequent to completion of the print process:
- applying a first force to the first end of the support bridge; and
- applying a second force to the second end of the support bridge, wherein the first and second forces act in opposite directions and cause the support bridge to disconnect from the first and second surfaces and from the in-air surface.

11. The method of claim 1, wherein the support bridge is configured to be pulled from the first end and the second end in opposite directions to thereby break a bond between the support bridge and the abutment layer.

* * * * *